United States Patent [19]

Tung et al.

[11] 3,902,950
[45] Sept. 2, 1975

[54] RUBBER TO POLYESTER ADHESION

[75] Inventors: William C. T. Tung, Tallmadge; Leroy C. T. Lin, Uniontown, both of Ohio

[73] Assignee: The Goodyear Tire & Rubber Company, Akron, Ohio

[22] Filed: Mar. 27, 1974

[21] Appl. No.: 455,435

[52] U.S. Cl............ 156/308; 156/110 A; 156/110 C; 156/313; 156/315; 427/307; 428/375; 428/400; 428/480
[51] Int. Cl.$^2$............................................ B29B 1/00
[58] Field of Search............ 117/47 R, 63; 156/307, 156/308, 110 A, 110 C, 313, 315; 260/31.8 XA, 31.8 G, 31.8 H; 264/341, 343, 347; 161/170, 175, 231, 240

[56] References Cited
UNITED STATES PATENTS

| | | |
|---|---|---|
| 3,240,649 | 3/1966 | Atwell................................ 156/308 |
| 3,422,180 | 1/1969 | Hanson et al....................... 264/341 |
| 3,549,740 | 12/1970 | Schwarz............................. 264/343 |
| 3,647,513 | 3/1972 | Jackson............................ 156/110 A |
| 3,703,426 | 3/1972 | Larson.............................. 117/47 R |
| 3,716,396 | 2/1973 | Shirano et al.................... 156/110 A |
| 3,730,918 | 5/1973 | Teti et al........................ 260/31.8 G |

Primary Examiner—Charles E. Van Horn
Assistant Examiner—Jerome W. Massie
Attorney, Agent, or Firm—F. W. Brunner; C. R. Schupbach; J. M. Wallace, Jr.

[57] ABSTRACT

This invention relates to a method for improving the adhesion of polyester reinforcement materials to rubber and to improving the fatigue resistance of polyester rubber reinforcing materials by modifying the polyester surface with a solvent such as hexafluoroisopropanol, treating the modified surface with an adhesive and incorporating the adhesive treated polyester in a rubber compound.

5 Claims, No Drawings

RUBBER TO POLYESTER ADHESION

This invention relates to a method for improving the adhesion of rubber to polyester reinforcing materials embedded in rubber.

Polyester is a commonly used reinforcing material for tires, conveyer belts and the like. Polyester fiber is smooth, hydrophobic and has an inert chemical structure which does not allow penetration of the surface of such fibers and offers little purchase for adhesives. Changes in the chemical structure of the polyester to allow more adhesion sites often produces unacceptable changes in mechanical properties.

For example, methods of polyester modification using acid or base chemicals to etch the smooth surface degrade and weaken the surface of the polyester and add materials cost and process steps to the final product. In such methods after etching is complete, the chemicals must be removed and the polyester washed or neutralized to prevent further degradation.

Other chemicals used to promote adhesion act as swelling agents, penetrating the polyester surface and promoting crystallization of the polyester fiber, Lawton and Cates, Journal of Applied Polymer Science, Vol. 13, page 899 (1969). Removal of these chemicals from the polyester fibers requires high temperatures for long periods of time. The crystallized fibers resulting from these processes suffer loss in mechanical properties such as fatigue resistance.

It is an object of the present invention to improve the adhesion of rubber to polyester reinforcing materials. Other objects will become apparent to those skilled in this art as the description proceeds.

The invention is accomplished by modifying the surface of polyester rubber reinforcement by treating the polyester surface with a solvent such as hexafluoroisopropanol, or a cosolution of hexafluoroisopropanol and a low boiling point organic liquid, and embedding the treated polyester in rubber. The effect of these solvents is to modify the surface of the polyester, making it amorphous and giving better mechanical adhesion. Thus it has been discovered that when the morphological structure of the polyester surface is subjected to solvent treatment to produce an amorphous surface, such surface allows adhesives to penetrate deeper into the polyester and form more lasting bonds with rubber. The amorphous surface has a high accessibility and does not seriously affect mechanical properties of the polyester.

In carrying out the process of this invention, the polyester cord is dipped in a solvent solution of hexafluoroisopropanol for a time sufficient to dissolve or soften the surface of the polyester leaving the core undissolved. Cord dip units well known to those skilled in the art can be used. Normally the cord is under from 1 to 10 pounds of tension, but preferably from 2 to 5 pounds of tension is used. The cord usually moves at a speed of from 2 to 10 yards per minute, but preferably from 5 to 7 yards per minute through a roller located under the surface of the solvent contained in the dip unit. The deformation of the smooth polyester surface is caused by the very rapid evaporation of the solvent. Slower evaporating solvents will not yield the amorphous surface necessary for improved bonding.

The solvent is normally used at a temperature of from 15° to 50 °C. but preferred temperatures are from 10° to 40° C. Solvent temperature and dip speed are interdependent, and together constitute the dwell time, i.e., the time the polyester must remain in the solvent for a desired level of polyester surface dissolution to occur. Lower solvent temperatures require a lower dip speed to have an equivalent dwell time in the solvent. The polyester cord has a normal solvent dwell time of from about 0.1 to about 5 seconds. The preferred dwell time of the cord is from about 0.5 to about 2 seconds. The most preferred dwell time is from about 0.8 to about 1.5 seconds.

Solvents useful in the practice of the present invention are generally those which have a boiling point between 30° and 150° C. and which rapidly dissolve polyester surfaces. The more preferred solvents are those having a boiling point in the range of from 30° to 65° C. Representative examples of solvents useful in this invention are hexafluoroacetonesesquihydrate and hexafluoroisopropanol, methylene dichloride and mixed solvents containing these solvents.

The term "polyester" as employed in this invention is intended to include homopolyester and copolyester.

Representative examples of thermoplastic resins useful in the practice of this invention are thermoplastic polyesters such as poly(ethylene terephthalate), poly(tetramethylene terephthalate), 80/20 poly(tetramethylene terephthalate/isophthalate) and 70/10/20 poly(tetramethylene/isophthalate/sebacate).

These polyesters are conveniently prepared by reacting aromatic dicarboxylic acids or ester forming derivatives thereof with a glycol of the formula HO(CH$_2$)$_n$OH where $n$ is an integer ranging from 2 to 10 to form the corresponding glycol ester and then polycondensing said glycol ester with elimination of glycol under conditions of elevated temperature and reduced pressures to form high molecular weight linear polyester or copolyester resins.

Representative examples of such polycondensation polyester resins include resins derived from dicarboxylic acids such as terephthalic acid, aliphatic dicarboxylic acids, such as adipic acid, sebacic acid, azelic acid and aromatic dicarboxylic acids such as orthophthalic acid, isophthalic acid, terephthalic acid, bibenzoic acid, naphthalic acid and the like. The resins can be made from various glycols such as those of the formula HO(CH$_2$)$_n$OH where $n$ is an integer ranging from 2 to 10 and including ethylene glycol, propylene glycol, tetramethylene glycol, pentamethylene glycol, hexamethylene glycol, and the like. Alkyl substituted polymethylene glycol such as neopentyl glycol and 2-methyl-2-ethylene and cyclic glycols such as cyclohexanedimethanol and 2,2,4,4-tetramethyl-1,3-cyclobutenediol. Ethylene glycol is a preferred glycol because of its low cost and ready availability.

Upon contact with the solvent system used the surface of the polyester filaments begin to dissolve. The high volatility of the solvent system used allows the dissolved polyester to resolidify into an amorphous state before the polyester molecular chains rearrange themselves into a crystal formation.

Solvent treated polyester surfaces are highly accessible for adhesion to form large surface area adhesion bonds. Microscopy examinations reveal that the surface of these solvent treated polyester filaments form some hairlike structures, called "whiskers", which aid in providing mechanical adhesion. These hair-like structures form when the extremely volatile solvent evaporates, carrying a portion of polyester above the original surface.

The examples below illustrate the invention. The solvents used were hexafluoroisopropanol (HFIP) and methylene chloride (MC). The solvents were used both alone and as cosolvents.

The 1300 denier, 8/8 twist, 3 ply poly(ethylene terephthalate) (PET) tire cord used in Examples 1 to 5 was dipped in hexafluoroisopropanol/methylene dichloride cosolvent under two pounds tension and at a speed of 5 yards per minute. The cord was immersed in the cosolvent system for about 1 second (dwell time), air dried at room temperature and rewound. The cord was then dipped in a conventional resorcinol formaldehyde latex (R/F/L) adhesive under 2 pounds tension and cured at 460° F. for 2 minutes.

One inch adhesion strips were prepared by winding the dipped cord around a drum having a 6 inch circumference until a 1 inch wide cylinder on the drum was obtained. Pressure sensitive tape was attached to the cords to hold them in place. The cylinder formed by the cords was cut from the drum through the pressure sensitive tape to form a strip 1 inch wide by 6 inches long, the cut cords being held in place by the tape. A compounded rubber body ply stock one-eighth inch thick was placed between two such strips. The resulting laminate was placed in a press and cured under 5,000 pounds per square inch gauge pressure at 300° F. for 20 minutes. The ends of the cord were separated from the rubber stock and placed in opposing jaws of an Instron tester. Samples were peeled with a jaw separation speed of 2 inches per minute at 250° F. using an environmental chamber and at room temperature. The rubber coverage of the peeled cords was estimated by visual inspection. The results are shown in Table 1.

Table 1

| Example | Room Temperature | Strip Adhesion, Pounds Per Inch, Width | | |
|---|---|---|---|---|
| | | % Rubber Cover | 250°F. | % Rubber Cover |
| Untreated Cord | 62 | 10 | 18 | 10 |
| 2  25 HFIP/75 MC | 75 | 20 | 30 | 50 |
| 3  15 HFIP/85 MC | 55 | 10 | 18 | 10 |
| 4  1 Nylon/24 HFIP/75 MC | 55 | 10 | 20 | 20 |
| 5  100 MC | 35 | 5 | 9 | 5 |

The treated polyester tire cords were also tested for fatigue by using a fatigue tube test with the results shown in Examples 6 to 10.

Treated PET cords were placed between two pieces of compounded body ply rubber stock forming a laminate one-fourth inch thick. The resulting laminate was cured into a tube having the cords parallel along the longitudinal axis. The tube was then attached to a tube fatigue tester at an angle of 90°, filled with an internal air pressure of 50 pounds per square inch gauge, and spun at high speed (600 revolutions per minute) until failure occurred or the sample had been rotated under these conditions for 1000 kilocycles. During the test the direction of rotation was reversed every 30 minutes. Test results are given in kilocycles in Table 2.

Table 2

| Example | Tube Life: Kilocycles |
|---|---|
| 6  Untreated Cord | 251.0 |
| 7  25 HFIP/75 MC | 356.8 |
| 8  15 HFIP/85 MC | 246.3 |
| 9  1 Nylon/24 HFIP/75 MC | 249.6 |
| 10 100 MC | 308.0 |

Examples 11 to 15 show the tenacity retention of a solvent treated cord tested against a control. Individual PET cords are clamped into supporting jaws of an instron tester and separated at a speed of 12 inches per minute. The tenacity retention is defined as tenacity after solvent treatment/original tenacity × 100%.
The results are given in Table 3.

Table 3

| Example | % Tenacity Retention |
|---|---|
| 11 Untreated Cord | 100 |
| 12 15 HFIP/85 MC | 98.5 |
| 13 20 HFIP/80 MC | 95 |
| 14 25 HFIP/75 MC | 90 |
| 15 30 HFIP/70 MC | 85 |

Physical properties of polyester cord treated using the process of this invention were checked against an untreated control in Examples 16–18. Denier was measured by placing the cord sample under tension, cutting a .9 meter section and weighing the cord length. Denier is determined by: sample weight × 10,000.

Tensile and elongation were determined using an Instron tester while the sample was maintained at 75 ± 2°F. and 55 ± 2% relative humidity. Tenacity was determined by $$\frac{\text{tensile (pounds)}_{\text{grams/pound}}(454}{\text{denier}}$$

The results are shown in Table 4 below.

Table 4

| Example | Denier | Tensile | Tenacity | Elongation |
|---|---|---|---|---|
| 16 Untreated Cord | 4307 | 66.1 | 6.96 | 15.5 |
| 17 20/HFIP/80 MC | 4365 | 63.9 | 6.64 | 16.1 |
| 18 25/HFIP/75 MC | 4554 | 61.9 | 6.17 | 15.9 |

Since the solvent systems of this invention affect only the surface of the polyester, the interior of the cords are unchanged, and thus retain largely unchanged physical properties.

While certain representative embodiments and details have been shown for the purpose of illustrating the invention, it will be apparent to those skilled in this art that various changes and modifications may be made therein without departing from the spirit or scope of the invention.

We claim:

1. A method for treating a polyester cord to improve rubber to polyester adhesion comprising dipping a normally smooth polyester cord in a solvent selected from the group consisting of hexafluoroacetonesesquihydrate and hexafluoroisopropanol for a time sufficient to dissolve at least a portion of the surface of the polyester cord, removing said cord from the solvent and allowing the solvent remaining on said cord to rapidly evaporate.

2. A method as described in claim 1 wherein the temperature of the solvent is between 20° and 40° C.

3. A method as described in claim 1 wherein the polyester is polyethylene terephthalate.

4. A method as described in claim 1 wherein the solvent is a mixture of hexafluoroisopropanol and the additional solvent methylene dichloride.

5. A method as described in claim 1 wherein the cord is subsequently coated with an adhesive and embedded in a rubber stock, followed by the step of curing said rubber stock with said cord as an reinforcing agent.

* * * * *